Dec. 7, 1965 B. WIDROW ETAL 3,222,654

LOGIC CIRCUIT AND ELECTROLYTIC MEMORY ELEMENT THEREFOR

Filed Sept. 8, 1961 6 Sheets-Sheet 1

INVENTORS
Bernard Widrow.
BY Marcian E. Hoff, Jr.

ATTORNEYS.

INVENTORS
Benard Widrow
BY Marcian E. Hoff, Jr.
Flehr and Swain
ATTORNEYS

INVENTORS
Bernard Widrow
BY Marcian E. Hoff, Jr.
Flehr and Swain
ATTORNEYS.

INVENTORS
Bernard Widrow
BY Marcian E. Hoff, Jr.

Flehr and Swain
ATTORNEYS

INVENTORS
Bernard Widrow.
BY Marcian E. Hoff, Jr.
Flehr and Swain
ATTORNEYS.

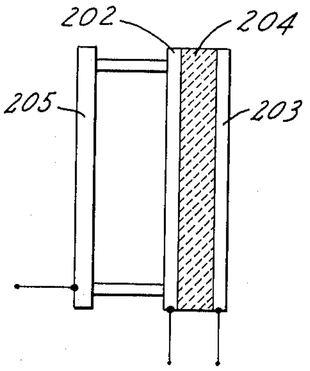
FIG. 19
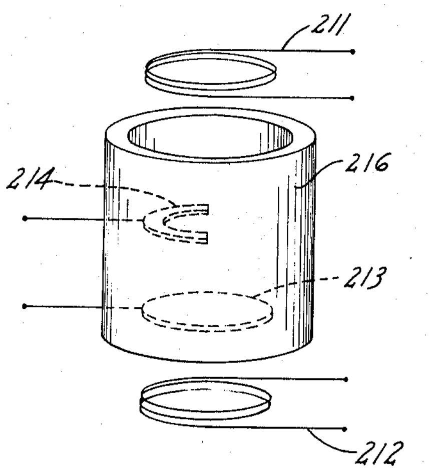
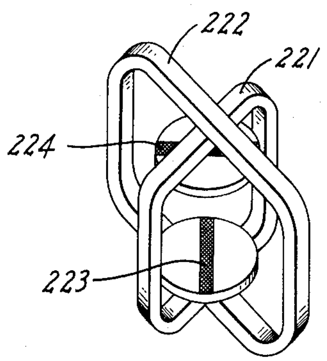
FIG. 20 FIG. 21
INVENTORS
Bernard Widrow.
BY Marcian E. Hoff, Jr.
Flehr and Swain.
ATTORNEYS United States Patent Office 3,222,654

Patented Dec. 7, 1965

3,222,654

LOGIC CIRCUIT AND ELECTROLYTIC MEMORY ELEMENT THEREFOR

Bernard Widrow, 775 Esplanada Way, Stanford, Calif., and Marcian E. Hoff, Jr., 76 Stony Point Road, Rochester, N.Y.

Filed Sept. 8, 1961, Ser. No. 136,829
19 Claims. (Cl. 340—173)

This invention relates generally to logic circuits and memory elements therefor and more particularly to adaptive logic circuits and adaptive memory elements therefor.

Logic circuits range from simple interlock systems to large scale digital computing systems. In general, these circuits are designed by working with boolean functions rather than with the logic circuits themselves.

An example is that the design of an interlock system for the control of traffic in a railroad switch yard. The first step is the preparation of a "truth table," an exhaustive listing of all input possibilities (the position of all incoming and outgoing trains), and what the desired system output should be (what the desired control signal should be) for each input situation. The next step is the construction of the boolean function, and the following steps are algebraic reduction and the design of the logical control system.

The design of the traffic control system is an example wherein a truth table must be followed precisely and reliably. Errors would be destructive. The design of arithmetic elements of digital computers is another example where the truth table must be followed precisely. Generally, in present day computers, all the details of organization, design and construction are completely planned before the computer is built. If a computer were built with an adaptive logic system, details of structure could be imparted by the designer, after completion of the computer, by training (showing the logic system examples of what he would like it to do and having it give the correct answer) rather than by direct designing. The concept of employing logic systems or networks which can be trained or adapted becomes more significant as the size and complexity of digital systems increases.

An adaptive or learning logic network automatically modifies its own structure to optimize its performance based on past experience. The system designer is more of an executive. Instead of seeing to all the details of the system design, he "teaches" by showing the system examples of input signals or patterns and what he would like the output to be for each input. The logic system or network itself organizes itself to comply as well as possible with the wishes of the designer. System competence will, in general, be directly and quantitatively related to its prior experience.

Logic systems of this type generally include a plurality of memory elements which serve to receive information and store the same in various forms, for example, as a magnetic flux, the position of a potentiometer wiper, digital weight storage and integrator circuits of the type used in analog computers. Memory elements of the foregoing type are, generally, expensive to manufacture and in most instances are large and cumbersome. Furthermore, they require substantial power to operate.

It is a general object of the present invention to provide an improved memory element.

It is another object of the present invention to provide a memory element which is capable of storing information which is applied in the form of an electrical signal.

It is another object of the present invention to provide a memory element in which information is stored by depositing material on a substrate.

It is another object of the present invention to provide a memory element in which information is deposited on or removed from a substrate in response to electrical signal information.

It is a further object of the present invention to provide a memory element which adapts or stores information by electroplating material onto or off of a subtrate in response to information signals.

It is still another object of the presnet invention to provide a logic circuit including memory elements of the above character.

It is another object of the present invention to provide a logic circuit including a plurality of memory elements each of said elements being electronically controlled to adapt the logic circuit to give a predetermined output for a given input.

It is still another object of the presnet invention to provide a memory element which is light, compact, reliable and inexpensive to manufacture.

These and other objects of the invention will become more clearly apparent from the following description when taken in conjunction with the accompanying drawings.

Referring to the drawings:

FIGURE 19 shows a memory element having capacitive read-out;

FIGURE 20 shows a memory element employing magnetic shielding for readout; and

FIGURE 21 shows a memory element employing magnetic coupling for readout.

Figure 1:
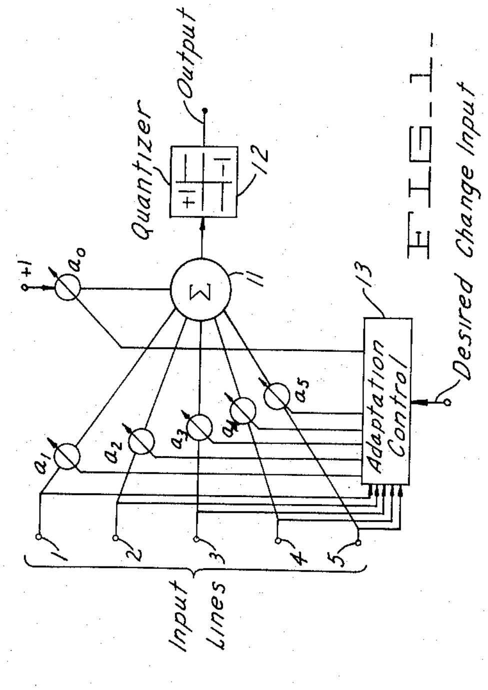
FIGURE 1 is a circuit diagram of an adaptive logic circuit.

Referring to FIGURE 1, there is shown an adaptive logic circuit. The circuit shown includes five input terminals 1, 2, 3, 4 and 5 connected to variable gain devices gain devices $a_1$, $a_2$, $a_3$, $a_4$ and $a_5$. The output of the gain devices is connected to a summer 11. A variable gain device $a_0$ is connected to apply a signal to the summer to establish the threshold level. The output of the summer is applied to a quantizer 12 which gives digital output signals. The adaptation control 13 adjusts the variable gain devices to cause the output to agree more closely with the desired performance.

Binary or analog signals are applied to the individual terminals. For example, a digital signal having the values $+1$ or $-1$ may be applied to each of the terminals. The summer forms a linear combination of the input signals. The amount of signal from each variable gain device is dependent upon the gain settings which can either have positive or negative values. The summer 11 sums the various weighted signals and applies them to the quantizer. The quantizer forms an output signal $+1$ if ths sum is greater than zero, and $-1$ otherwise. The threshold level is, in effect, determined by the gain setting of $a_0$, whose input is permanently connected to the $+1$ source. Varying the gain of $a_0$ controls a constant added to the linear combination of signals at the summer.

For fixed settings of the gain controls, each of the $2^5$ possible input combinations causes either a $+1$ or a $-1$ output. Thus, all possible inputs will be classified into two categories. The input-output relationship is controlled or adapted by adjusting the gains. In an adaptive circuit, the gains are set during the training procedure.

In general, there are a large number of input-output relationships or truth functions by which the five input variables can be mapped into the single output variable. Only a sub-set of these, the linearly-separated truth functions, can be realized by all possible choices of gains of the circuit of FIGURE 1. Although this sub-set is not all inclusive, it is a useful sub-set, and it is searchable, i.e., the best function in many practical cases can be found iteratively without trying all functions within the sub-set.

A circuit of the foregoing type can be employed for adaptive pattern classification. The circuit may, for example, employ a threshold control and nine variable gain lines which are connected to a three-by-three array of nine switches which can be set to provide an input pattern of $+1$'s and $-1$'s. The input of the variable gain lines may also be from punched card, magnetic tape, punched tape or any other source of binary information.

Assume that the upper row of switches and the center vertical column are set to give the input value $+1$, and the remainder have a $-1$ input. The pattern is a T. The output of the summer can be observed on a meter. Each of the gains and the threshold are then all changed by substantially the same absolute magnitude to reduce the error (the difference between the actual and the desired meter readings) to zero. One way of achieving this is by adjusting the gains so that the error is reduced by $\frac{1}{10}$ for each gain line. The gains may be changed in any sequence, and after all changes are made, the error for the input pattern (T) is zero.

Assume a new pattern is entered. For example, the pattern C, which is achieved by arranging the switches on the upper and lower horizontal rows and the left-hand side vertical column to give a $+1$ input while the remainder give a $-1$ input. The gains are then adjusted to give the desired output at the summer. If the first pattern is re-applied at this point and the error read, the error will be relatively small. By repeatedly applying the patterns and correcting the errors, the errors will tend to zero; the corrections each time successively growing smaller. The routine is purely mechanical and requires no thought on the part of an operator. Any time one of these patterns is applied, the logic circuit will classify the pattern by giving the correct desired output. The logic circuit can be trained to classify still other patterns by repeating this iterative procedure.

The variable gain can be achieved physically by using a variable resistance, capacitance, inductance or any combination of these. However, conventional elements of this type are relatively expensive and difficult to vary electronically.

In accordance with the present invention, there is provided an improved memory element in which the gain values, which can be positive or negative, can be electronically controlled. More specifically, the novel memory element of the present invention includes a substrate onto which material is reversably deposited in response to electrical information signals. The amount of deposit on the substrate is representative of the information. The information is recovered at any time by sensing the amount of deposit.

Figure 2:
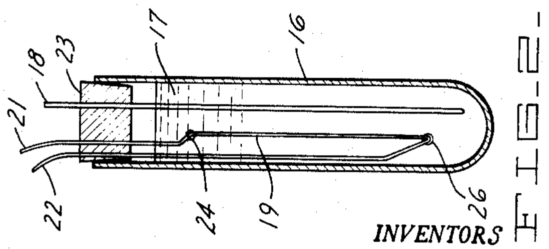
FIGURE 2 is a sectioned elevational view showing a memory element according to the invention.

A memory element in which material is deposited on a substrate by electroplating is shown in FIGURE 2. The device includes a vessel or container 16 for the electrolyte 17. Immersed in the bath then is an electrode 18 which is the source of plating material and a conductive substrate 19. Attached to the spaced points of the substrate are leads 21 and 22. The electrode 18 and leads 21 and 22 are supported by the stopper 23. Material can either be plated from the electrode 18 onto the substrate 19 or from the substrate 19 back onto the electrode 18 by applying a D.-C. current between the substrate 19 and plating electrode 18. The resistance between the spaced points contacted by leads 21 and 22 varies in accordance with the amount of material plated onto the substrate 19. The plating is controlled by controlling the D.-C. current. The resistance of the substrate is preferably detected by an alternating current source so that there is no plating action giving nondestructive sensing. If a D.-C. current is present in series with the substrate, it would cause material to be removed from one end of the substrate and deposited on the other end, thus disturbing the stored information.

Figure 3:
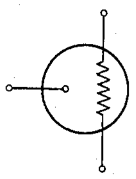
FIGURE 3 shows a suggested symbol for the memory element.

The device may be symbolically represented as shown in FIGURE 3. In the circuits which follow, this symbol is employed to represent the memory element.

A memory element of the foregoing type was constructed in which the substrate comprised 2¾ inches long fine type H medium hard pencil lead. The ends 24 and 26 of the substrate were plated so that connections could be soldered thereto. The end connections were insulated by painting with lacquer. The source electrode was copper. The electrolyte was 75 grams per liter of $H_2SO_4$, and 240 grams per liter of $CuSO_4$. Reversing the direction of plating showed hysteresis. An electrolyte of the above type having added thereto 4 grams per liter of phenol sylphonic acid and lignin (Dacolite) showed no hysteresis. The substrate varied in resistance from the unplated value of 8 ohms to the fully plated value of ¼ ohm. With 100 ma. D.-C. current applied, the full range of resistance was covered in 1½ minutes.

A device of this character has the advantage that the information can be processed rapidly. The plating process, which is relatively slow, determines the rate of change of the system structure which should always be slower than the rate of processing or filtering of information.

Figure 4:
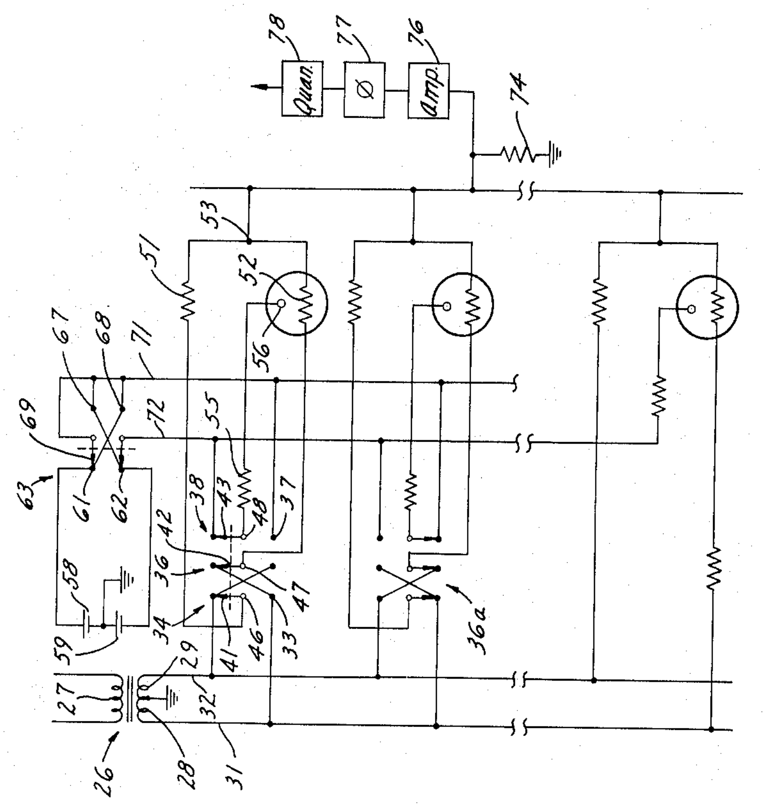
FIGURE 4 shows the weights and summing circuits, and the quantizer of an adaptive logic circuit incorporating the memory elements of FIGURE 3.

Referring to FIGURE 4, there is shown the weights and summing circuit of an adaptive logic circuit including memory elements of the type described. The circuit includes a transformer 26 having a primary winding 27 and a center tapped secondary winding having winding positions 28 and 29. The transformer provides alternating current power to the lines 31 and 32. The phase of the voltage on the two lines has 180° phase relationship. The lines 31 and 32 are connected to the contacts 33 and 34, respectively, of input switches 36. The switches include a second set of contacts which are cross-connected to the contacts 33 and 34. The switches include additional contacts 37 and 38. The switch arms 41, 42 and 43 are ganged and connect the terminals 46, 47 and 48 selectively to the upper contacts or the lower contacts.

The reference resistor 51 and the memory element substrate 52 form two legs of a bridge which are connected to the terminals 46 and 47. When the switch is "up" or "down," the secondary winding portions 28 and 29 form the other legs of the bridge. The output from this bridge is obtained at the bridge terminal 53. The phase of the voltage on the bridge is reversed by reversing the switch. Thus, in the upper position, the phase can be 0° and represent +1; while in the lower position, the phase is 180° and represents −1. The output phase is also representative of +1 or −1 and will depend upon the value of the substrate resistance and the input phase. For a 0° phase input, the output can be either phase 0° or 180° (+1 or −1) depending upon the value of resistance of the substrate.

The value of resistance of the substrate is controlled by plating which, in turn, is controlled by the D.-C. current flowing in the memory element. The terminal 48 of the switch 36 is connected through a current limiting resistance to the source electrode 56. Current is supplied from the batteries 58 and 59 which apply a plus and minus voltage with respect to ground to the contacts 61 and 62 of the switch 63. The contacts 64 and 66 are cross-connected to the contacts 61 and 62. The terminals 67 and 68 are connected to the arms 69 and, depending on the position of the arms, a voltage of one or the other polarity with respect to ground is applied to the lines 71 and 72. The lines 71 and 72 are connected to the contacts 37 and 38 of switch 36. With the switch 36 in the up or down position, the resistance of the substrate 52 can be controlled by plating on or off material. This is controlled by the position of the switch 63.

It is noted that the various switches 36 are connected in a similar manner. Referring to the drawing, switch 36 is in the up position, while switch 36*a* is in the down position. This may correspond to a +1 and −1 input, respectively. If the logic circuit is being trained to give a +1 output (an output voltage of given phase and magnitude), the switch 63 is actuated until the sum output is the desired phase and magnitude. The sum output obtained across resistor 74 may be amplified at 76 and phase detected 77, and quantized at 78.

It will be observed from the circuit shown that regardless of the position of the switches 36, the resistance change of the individual substrates will be in a direction which will make all of the outputs more positive or more negative.

The lower memory element 78 adjusts the threshold value and is adjusted up or down dependent upon the position of the switch 63.

The input switches 36 are set to provide the input patterns. Once the switches are set for a particular input pattern and the desired output is known, the adaptation switch 63 is manipulated to cause the circuits to adapt themselves to give the desired output. The phase and magnitude of the output will indicate whether there is a +1 or −1 value on the output.

A logic circuit of the type shown in FIGURE 4 was constructed in which the transformer had a voltage output of 0.2 v. R.M.S. The current limiting resistors 55 had a value of 560 ohms; the reference resistors 51 had a value of 5 ohms; the substrate had an unplated value of 100 ohms; the electrolyte was $$CuSO_4+H_2SO_4+\text{Dacolite}$$

the electrode material was copper; and the summing resistor had a value of 1 ohm. The memory element in this circuit was that of FIGURE 9.

Figure 5:
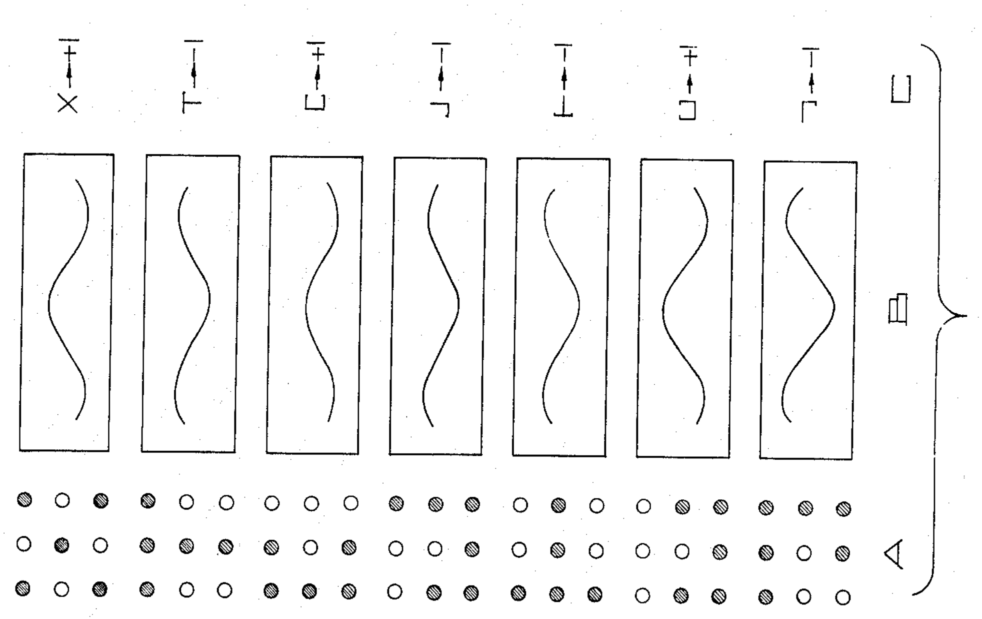
FIGURES 5A, 5B and 5C show sample input data, desired output and waveforms for the logic circuit of FIGURE 4.

The circuit had nine variable resistance legs and a threshold control leg. The input patterns corresponding to X, T, C, J and T, C, J rotated 90° (see FIGURE 5A) were trained into the logic circuit. The desired outputs were +1, −1, +1, −1, −1, +1 and −1, respectively (FIGURE 5C). The sum waveforms appearing at the summing resistor were as shown in the center of the figure (FIGURE 5B). The speed of convergence of the adapting process was rapid. After training, the logic circuit remained unchanged for days. In one instance, after four days of storage, the output responses to the original training input patterns were observed, and there was substantially no change from those at the time of original storage.

Figure 6:
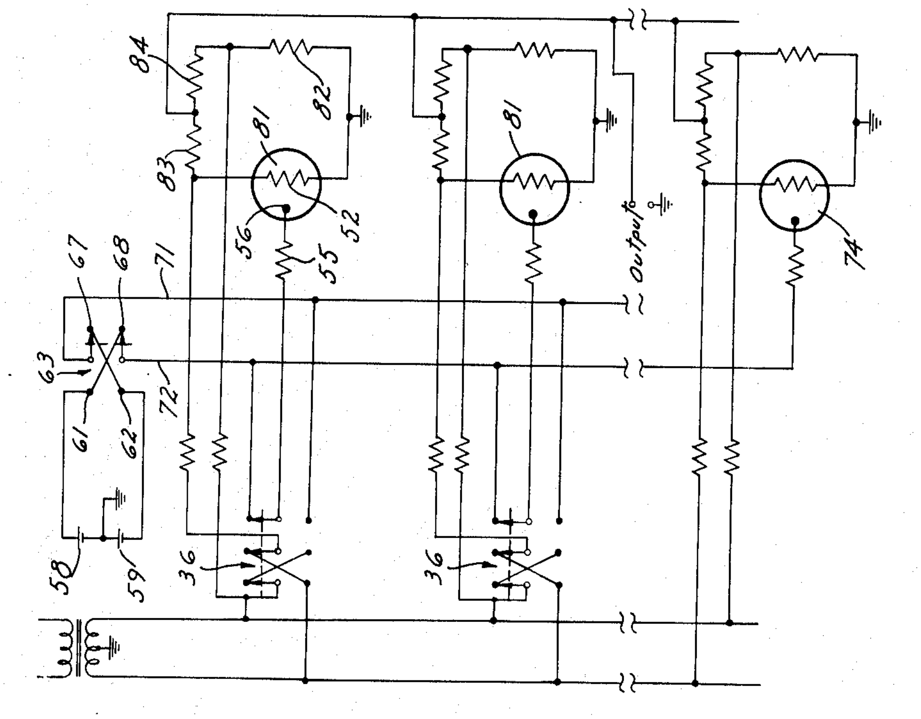
FIGURE 6 shows another weights and summing circuit for the logic circuit.

Another logic circuit is shown in FIGURE 6. This circuit is similar to the circuit of FIGURE 4 and like parts bear the same reference numbers. The memory elements 81 and the reference resistances 82, 83 and 84 are driven by equal and opposite A.-C. current sources. Their voltages are summed in the bridge circuit. A gain of zero corresponds to the substrate and resistance 52 having equal resistance. Utilization of the full dynamic range of the variable resistance substrate can be made by having the reference resistance be the average of the resistance extremes.

Figures 7, 8, 9, 10:
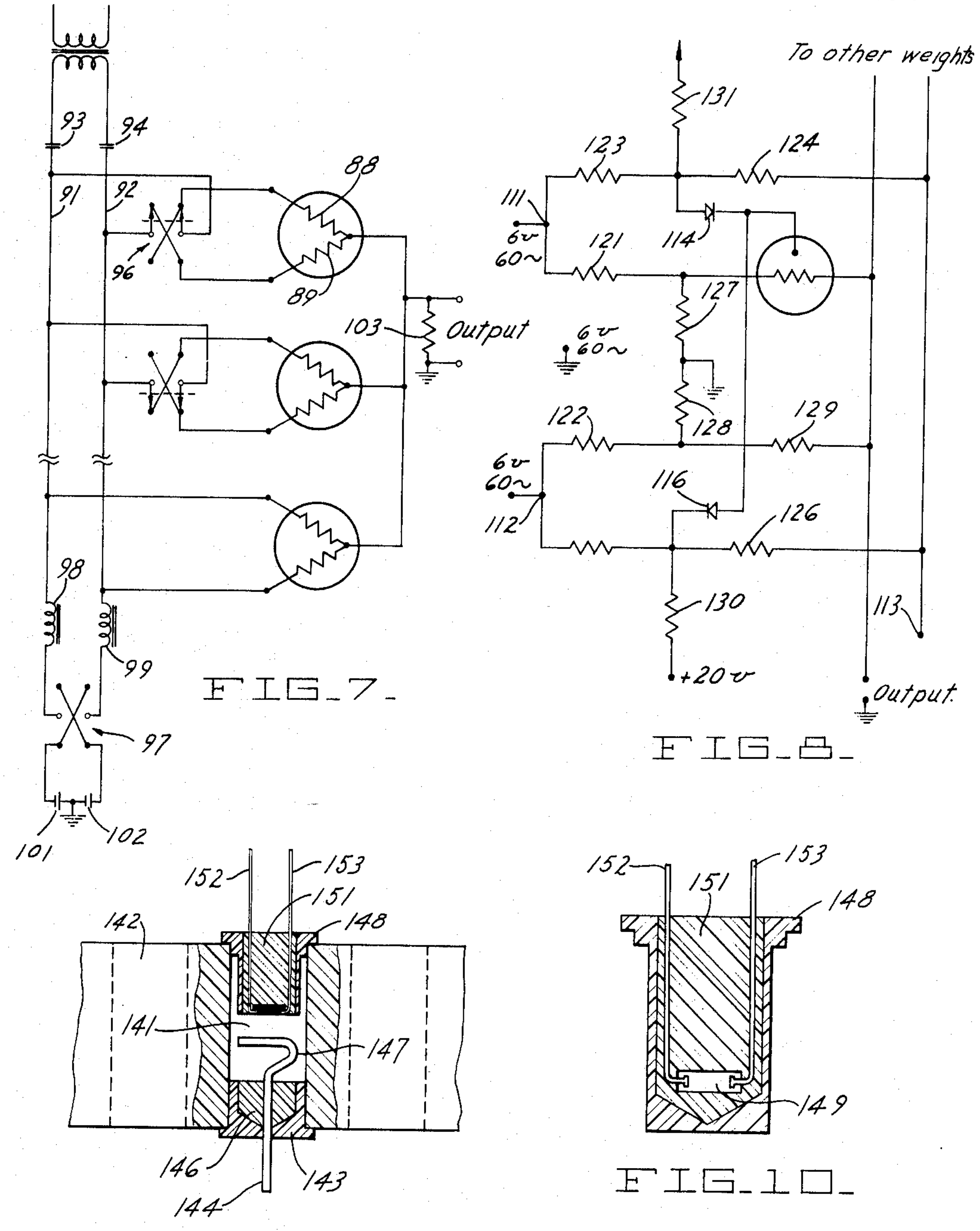
FIGURE 7 shows a weights and summing circuit for the logic circuit which employs a memory element having two substrate elements.
FIGURE 8 is a circuit diagram which combines the weight, summing unit and adaptation control for a single weight and input of a logic circuit which automatically adapts.
FIGURE 9 is an elevational view, partly in section, of a memory element.
FIGURE 10 shows the substrate electrode for the memory element of FIGURE 9 in a stage of manufacture.

The circuit of FIGURE 7 employs a different type of memory element. Two substrates 88 and 89 are immersed in the same bath with a substantially equal amount of initial plating. There is no source of material other than the material plated on the substrate present. Change in the bridge balancing is accomplished by plating from one substrate to the other by applying equal and opposite D.-C. voltage components along with the A.-C. sensing current voltages.

Referring to FIGURE 7, the input A.-C. voltage is capacitively coupled to the lines 91 and 92 by capacitors 93 and 94. Switches 96 provide the +1 or −1 input phase. Switch 97 provides the D.-C. plating current. Chokes 98 and 99 isolate the batteries 101 and 102. The sum is obtained at resistor 103.

During the adaptation process, the direction of plating in the individual memistor cell depends on the sign of its input signal and whether it is desired to increase or decrease the summed signal. In the logic circuits of FIGURES 4 and 6, the individual logical decisions are made by the third set of contacts on the input switches. In an all electronic multilogic network, switches with extra sets of contacts would not be available. It is necessary that the polarity of the individual input signal make its effect felt so that the individual plating current is derived from the individual input signal itself. In the circuit of FIGURE 8, the A.-C. input signals are rectified in a bridged phase detector circuit to provide D.C. pulses for plating. Only a signal input and a variable weight are shown. The actual circuit would contain many inputs and weights.

The electronic logic circuit shown in FIGURE 8 provides readout of the information stored in the memory elements and also modifies, on signal command, the plating according to the adaption procedures previously described. Input signals are represented by A.-C. voltages of equal magnitude but of opposite phase, i.e., one phase represents an input signal of +1, the other an input of −1. The input to the memory element is very similar to the one described above; for an input of +1, the plus phase is connected to the memory element input terminal 111 and the minus phase is connected to the reference resistor input terminal 112. For an input of −1, the connections are reversed.

To modify the plating, one of the two phases is applied to the desired change input terminal 113. If this signal is in phase with the signal at the memory element input terminal 111, a large A.-C. voltage will appear at terminal A; simultaneously the desired change and reference resistor input voltages will be of opposite phase and will produce very little net A.-C. voltage at terminal B. With sufficient A.-C. voltage at terminal A, the upper diode 114 will conduct on the positive peaks, thus plating onto the memory element substrate. For an input of +1, this will cause the output to become more positive. The values of the bias voltages are set so that when the desired change command signal is zero, the A.-C. voltages, appearing at terminals A and B due to the input signals, will be insufficient to cause conduction in either diode 114 or 116.

The following table indicated the operation of the circuit:

| Input Signal | Desired Change | A.-C. at A | A.-C. at B | Effect on Memory Element | Effect on Output |
|---|---|---|---|---|---|
| +1 | 0 | ½+ | ½− | None | None. |
| −1 | 0 | ½+ | ½+ | do | Do. |
| +1 | +1 | 1+ | 0 | Plates | Increases. |
| −1 | +1 | 0 | 1+ | Strips | Do. |
| +1 | −1 | 0 | 1− | do | Decreases. |
| −1 | −1 | 1− | 0 | Plates | Do. |

Thus, the circuit realizes the previously described adaptation techniques. As the desired change signal can be connected to many logic circuits in parallel, the magnitude of the gain represented by each memory element can be changed by an amount determined only by how long the signal is applied at the desired change terminal.

A circuit in accordance with the foregoing was constructed and operated. It automatically adapted in response to an input pattern and a desired output. The circuit components were as follows:

Resistors 121 and 122, 220 ohms; resistors 123, 124, 125 and 126, 680 ohms; resistors 127 and 128, 1 ohm; resistor 129, 10 ohms; resistors 130 and 131, 1200 ohms; and diodes 114 and 116, 1N482A. Input voltage 6 volts, 60 cycle. Bias voltage ±20 volts D.-C. Command voltage 6 volts, 60 cycles.

The memory element shown in FIGURE 2 works satisfactorily; however, memory elements can be arranged more compactly and can be sealed from external conditions making the memory elements more stable and more satisfactory for use in large numbers in logic circuits of the type shown in the various figures. In FIGURES 9 and 10, there is illustrated one type of compact memory element. The memory element is described in terms of its manufacture.

One type of memory element is constructed as follows: holes 141 are drilled in a block of plastic material, for example, polystyrene. The block may be any material which is not effected by the electrolyte used in the particular memory element. A hollow cap 143 of polystyrene or other inert material having a small hole is used as support for the source of material. The source wire 144 (copper) is inserted through the hole and the hollow space is filled with an epoxy potting compound 146. When the epoxy has hardened, the source wire is trimmed and bent as shown at 147. After cleaning the source wire, the cap is placed in one end of the hole 141 and sealed using cement, thus providing a rigid copper source extending into the hole 141.

A second hollow polystyrene cap 148 (FIGURES 9 and 10) is used to support the substrate. The substrate may, for example, comprise a carbon composition resistor 149 (in one example, the resistor was 1/10 watt, 100 ohms) which is inserted into the hollow of the cap. The cap is then filled with epoxy potting compound 151. When this compound has hardened, the end of the cap is ground off using a wet belt sanding machine until the resistor is half removed, exposing its copper connection leads 152 and 153. The resistance between leads is increased (in the example, it will be between 160 and 180 ohms). A light plating of rhodium is then applied to the surface to protect the copper leads and cover the graphite substrate. The plating is applied using the following plating bath:

| | |
|---|---|
| Rhodium (as the sulfate) | 5 grams/liter. |
| Sulfuric acid | 50 ml./liter. |

Plating is done at room temperature with a current density of 10 ms./cm.$^2$. The time is approximately 2 minutes. The actual time is determined by plating the resistor until the resistance is lowered to a predetermined value (50 ohms in the example). The cell, with the source already installed, is filled with electrolyte. The substrate cap is sealed in place with suitable cement. The memory element thus formed plates from about 50 ohms to 1 ohm in approximately 10 seconds, using a control current of 2 ma.

Figure 13:
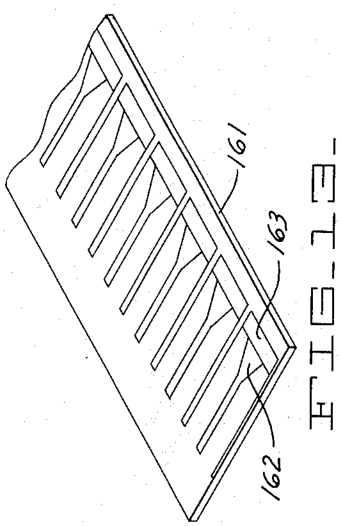
FIGURE 13 shows another glass substrate electrode configuration used for the memory elements of FIGURES 11 or 12.
Figure 11:
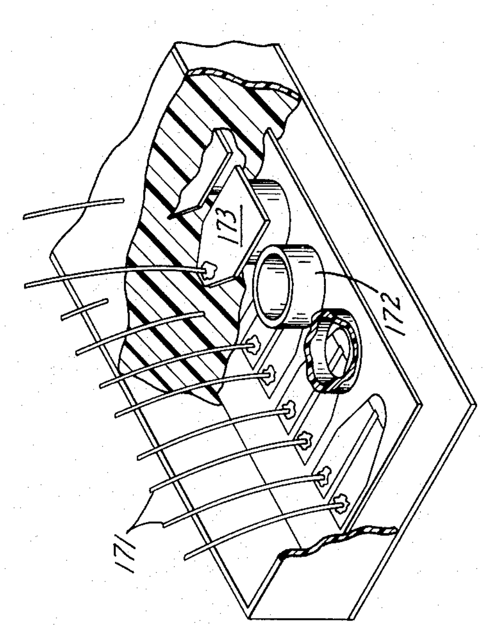
FIGURE 11 shows a multiple memory element arrangement.
Figure 12:
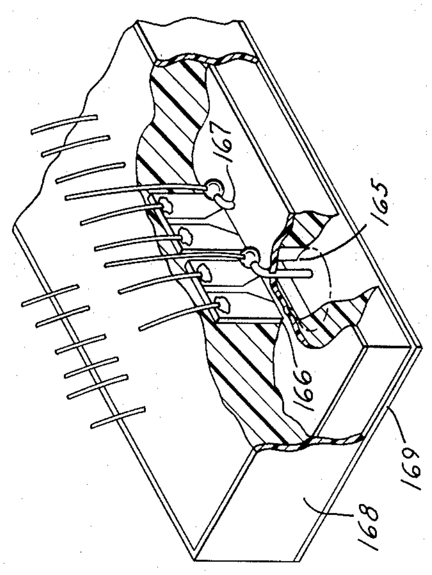
FIGURE 12 shows another multiple memory element arrangement.

In FIGURES 11 and 12, there are shown memory elements which include a glass substrate. The substrate comprises glass sheets having an electrically conductive coating of tin-oxide on one surface. This coated glass typically has a surface resistivity of 50 ohms/square. The glass sheets are cut into small pieces 161 (FIGURE 13) and a mask of plastic electrical tape is cut and attached to the glass so as to cover all the shaded areas in FIGURE 13. The exposed tin-oxide is then removed by sand blasting or by chemical reduction, e.g., by reacting zinc metal powder with hydrochloric acid adjacent to the surface. The mask may also be produced photographically using photoresist. This mask does not survive sandblasting, but does work well when chemical reduction is used. After removing the undesired tin-oxide to leave the clean areas 162, the mask is removed.

The pattern of tin-oxide remaining performs two functions, i.e., provides an inert high-resistance element area on which to plate, and a low resistance inert lead connection between the ends of the element area and points outside the cell. Two types of element area 163 have been found to give good results. The first type of element area is unplated tin-oxide; the second type is tin-oxide, lightly plated with rhodium. In both cases low resistance leads have been obtained by plating first rhodium, then gold, and a final plating of rhodium. (The three layers are used because: (1) heavy rhodium plates tend to peel; (2) gold is of lower resistivity than rhodium; (3) a final rhodium plate protects the gold against attack by the cell electrolytic action and also enables soldering to the lead without damage to the gold plating.)

The two types of element differ in construction in only one step: to produce an unplated tin-oxide element, a mask of plastic electrical tape is attached to cover the element area prior to any of the plating processes, to produce an element area covered with rhodium, the tin-oxide is left unmasked through the first plating of rhodium. Then a mask of plastic electrical tape is attached as above. In both cases, these masks are left in place through the rest of the plating processes.

The plating processes are as follows:

*Preplate:* (1) The tin-oxide is prepared for rhodium plating by placing the glass into 0.1 N sulfuric or hydrochloric acid, and passing a current of five milliamps per cm.$^2$ in the normal plating direction for 1 minute, with a platinum anode. This process reduces some of the tin-oxide to metallic tin. The glass surface is then carefully wiped and cleaned to remove any tin which has not adhered; 1st rhodium: (2) After cleaning, the first coat of rhodium is applied, using 5 to 10 milliamps of current per cm.$^2$, for 2 to 3 minutes at room temperature. One of the following baths is generally used:

| Bath | A | B | C |
|---|---|---|---|
| Rhodium metal (as sulfate) (grams/liter) | 2 | 5 | 10 |
| Sulfuric acid (ml./liter) | 25 | 50 | 50–100 |

(3) The lead areas are then gold plated using Wilbro Bright Gold Plating Process #1, available from Wildberg Bros., San Francisco. This is a gold cyanide bath containing one troy oz. of gold per gallon. Plating conditions are 3 to 5 minutes at 1 to 3 milliamperes per cm.$^2$, with the bath at room temperature; (4) The final coat of rhodium is applied in the same manner as the first rhodium coat described in step 2 above.

After producing substrate elements or electrodes as described above, the cells are produced. Again, there are several techniques of manufacture which have been used. One technique consists of cutting the elements apart, attaching lead wires, and mounting them (together with source wires) in holes 165 in a polystyrene block, as shown in FIGURE 12. The cells are sealed with cement at the points 166 and 167 where the substrate electrodes and source wires enter the cell respectively. Side walls 168 are then attached, and epoxy potting compound poured into the resulting space. When the epoxy is hard, a specially prepared sheet 169 of polystyrene is cemented over the open cells, sealing them. This sheet is drilled so that when in place, two small holes intercommunicate with each cell. The cells are filled with electrolyte using a hypodermic syringe to inject plating bath through the holes. When filled, the cells are sealed by sealing over the small holes. The source electrode 163 and the source of material 169 are displaced in the electrolyte.

A second technique for constructing cells uses a sheet of substrate elements. The tin-oxide and platings at the top of the sheet (opposite the substrate element areas) are removed by sandblasting, thus separating the elements. Lead wires 171 are then soldered in place. The cells are formed by cementing hollow polystyrene cylinders 172 over the elements. The metal sources for these cells are the cell caps 173, which are cemented in place after the cells are filled. The entire sheet is then cast in epoxy potting compound.

Figure 14:
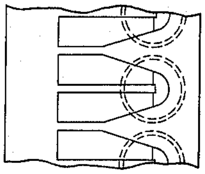
FIGURE 14 shows a glass substrate electrode for the memory element of FIGURES 11 and 12 in a stage of construction.

FIGURE 14 shows another substrate element configuration.

Figure 15:
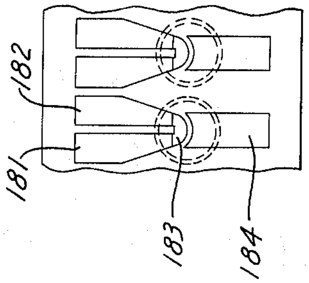
FIGURE 15 shows a glass substrate including substrate and material source electrodes.

It is possible to produce the source electrode on the glass substrate. FIGURE 15 shows such a construction. The low resistance leads 181 and 182 connect to the substrate element 183. During masking, source electrode 184 is masked. After mounting a hollow polystyrene cylinder as shown, the cell is filled with plating bath, and using an external anode, the source electrode is plated with a sufficient amount of material, the external anode removed, and the cell sealed with a sheet of polystyrene cemented in place.

An additional construction process consists of mounting several substrate electrodes and their sources in a common bath. By mounting the source sufficiently close to its associate substrate element, the effects of cross plating can be made negligibly small. This construction may be used when all elements are operated at the same D.-C. voltage level.

There has been described a number of memory elements including a substrate, an electrolyte and a source of material which can be reversibly plated onto the substrate. One memory element included a copper source and a suitable electrolyte.

It is apparent that a variety of materials can be used for the substrate. The substrate should be relatively inert to the electrolyte so that it is not eroded away with the passage of time. The source material should be a material which forms a stable plating. The electrolyte depends upon the materials being plated.

Copper, nickel and cobalt have been found satisfactory.

The nickel and copper were suitable for the types of substrates (carbon, tin-oxide and rhodium) described. Cobalt has been used for a carbon or graphite substrate. The following are examples of plating baths:

Copper plating baths:

| Bath | A | B | C | D |
|---|---|---|---|---|
| Copper Sulphate ($CuSO_4$ $5H_2O$) g./liter | 240 | 240 | 326 | 326 |
| Sulfuric Acid (C.P., S.G.=1.84) g./liter | 67 | 67 | 24.5 | 24.5 |
| Brightener | 0 | Percent sat. | 0 | Percent sat. |

(Du Pont—Dacolyte)

(Added to saturate boiling solution—then cooled and filtered)

Nickel plating baths:

| | |
|---|---|
| Nickel Sulfate, g./liter | 244. |
| Nickel Chloride, g./liter | 38. |
| Boric Acid, g./liter | 46. |
| Addition agent, N–11[1] | 3% of volume. |
| Addition agent, N–124[1] | ½ volume. |
| Addition agent, N–13[1] | .1% volume. |

[1] Harshaw Chem. Co., Cleveland, Ohio.

These addition agents are available from Harshaw Chemical Co., Cleveland, Ohio.

Cobalt plating bath:

| | Gm./liter |
|---|---|
| Cobalt Sulfate ($CoSO_4$) | 278 |
| Sodium Chloride | 17 |
| Boric Acid | 45 |

Figure 16:
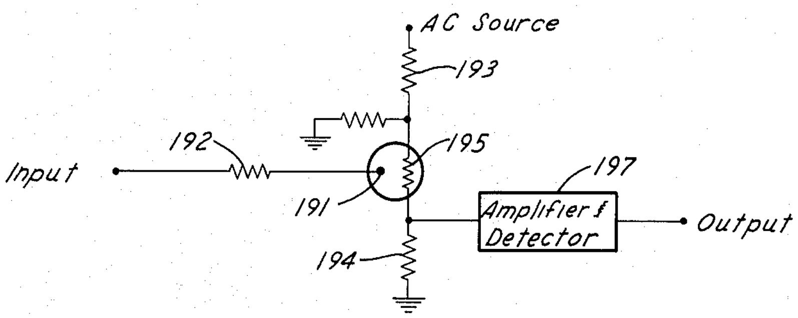
FIGURE 16 shows an integrator circuit employing memory elements of the present invention.

The memory elements of the present invention may also be used for purposes other than variable weights in adaptive logic circuits. For example, a memory element may be used as an integrator in an analog computer. Such a circuit is shown in FIGURE 16. The inputs are applied to the memory element source element 191 through appropriate resistor 192 (sufficient to limit plating current to a safe value for the largest input voltage). The output of the integrator is obtained by applying an A.C. readout voltage to the series combination of resistors 193 and 194 and the substrate 195. The voltage across resistor 194 is amplified and detected 197 to provide the integrated output.

This integrator may also be used with multiple inputs. Several input resistors may be used connected to the same source electrode, or several source electrodes in the same bath may be provided, each with a single input resistor. These integrators may have very long leakage time constants and may be used when inputs are applied over very long periods of time. They also store the information even when the power is turned off. An integrator of this type may be used as a pulse counter by connecting the pulses into the input. The pulses may be standardized, if necessary, with a one-shot multivibrator or blocking oscillator. By connecting the integrator input to a fixed D.C. source and connecting the output to an indicating meter, it may be used as a continuously indicating timer. An integrating circuit of this type may also be used for digital storage, combining several bits of storage in one memory element.

Figure 17:
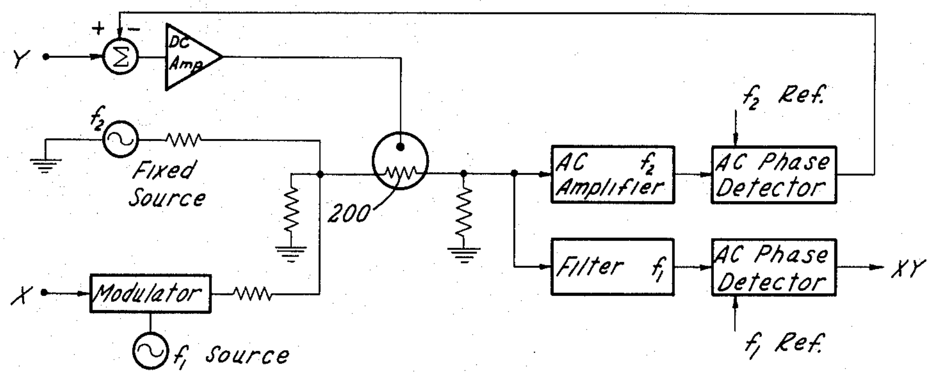
FIGURE 17 shows a multiplier circuit employing memory elements of the present invention.

With appropriate additional circuitry, the memory element may be used as a highly accurate electronic multiplier. A multiplier circuit is shown in FIGURE 17. The X input is used to amplitude modulate an A.C. voltage of one frequency, $f_1$. A fixed source of A.C. of a second frequency $f_2$, is added linearly to the first, and the combined sum connected to a memory element substrate 200. The memory element is then plated or stripped to cause the amplitude of the amplified component of the frequency $f_2$ to equal the input Y. The amplitude of the frequency $f_1$ will equal XY.

Figure 18:
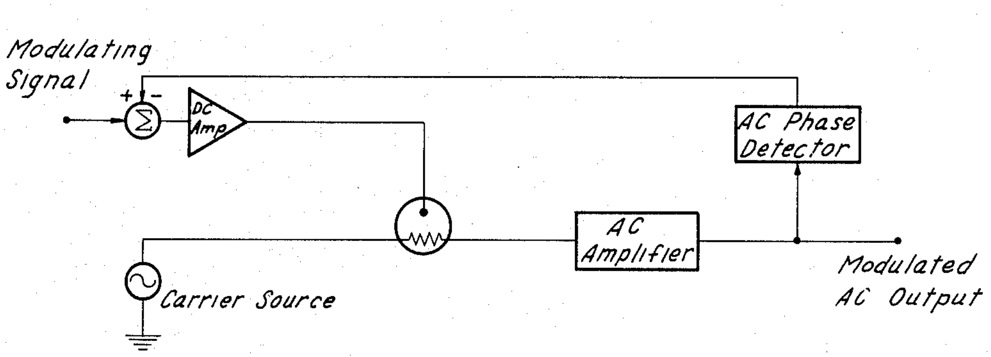
FIGURE 18 shows a modulator circuit employing memory elements of the present invention.

This multiplier may also be used as a linear modulator replacing the frequency $f_1$ with the carrier, and input Y with the modulating signal, omitting the signal X. Such a circuit is shown in FIGURE 18.

By controlling the geometry and resistance of the memistor element, a very rapid, high ratio element may be constructed. Such a memistor may be used as a type of latching relay; momentary application of a positive signal closes the circuit which remains closed until the momentary application of a negative signal.

Besides measuring the resistance of the memistor element, additional techniques may be used to readout the information stored as a quantity of plated material. Referring to FIGURE 19, by making the substrate element 202 the first plate of a capacitor with the second plate 203 printed on the back of the substrate support 204, the effective capacitance and series resistance of the capacitor may be varied by plating onto the element from the source 205. The second plate may be divided into two sections so that the A.C. readout circuits may be D.C. isolated from the plating circuits.

The material plated onto the memistor substrate may be used to vary the characteristics of a magnetic circuit. Ferromagnetic materials, such as nickel, cobalt or iron, may be plated to increase the coupling between two magnetic circuits, or conducting materials may be plated in such a way as to provide eddy current shielding between two magnetic circuits. Both of these plating techniques may also be used to vary the self-inductance of a single coil.

Referring to FIGURE 20, the memory element comprises input and output coils 211 and 212. A substrate plate 213 is disposed between the coils. The source electrode 214 is arranged whereby it does not shield the magnetic fields. The source electrode 214 and substrate may be disposed in a reservoir 216. As material is deposed on the substrate, the degree of shielding between the coils is increased.

Referring to FIGURE 21, there are shown two coils 221 and 222 arranged so that there is no coupling between the same. Substrate materials 223 and 224 are arranged at right angles with respect to one another and at a 45° angle with respect to the coils 221 and 222. As magnetic material is plated from one end of the substrate to the other, the coupling may be changed 180° in phase and set to any magnitude.

We claim:

1. A memory element comprising a supporting material, a conductive film formed on said material, said film including lead portions and a substrate portion having its ends connected to the lead portion, means for receiving an electrolyte, and electrolyte in said receiving means, said supporting material cooperating with said electrolyte so that at least the substrate is immersed in the electrolyte, a source of plating material in said electrolyte, means for reversibly plating the material on said substrate, and means connected to said lead portions for sensing the resistance of said substrate.

2. A memory element as in claim 1 wherein said lead material is not dissolved by the electrolyte.

3. A memory element as in claim 1 wherein the supporting material is glass and the film is tin oxide.

4. A memory element as in claim 3 wherein the lead portions of the tin oxide are plated alternately with rhodium and gold.

5. A memory element as in claim 1 wherein said means for receiving the electrolyte comprises a well formed in a plastic block of material.

6. A memory element as in claim 1 wherein said means for receiving the electrolyte comprises a cylinder sealed to the supporting material.

7. A memory element as in claim 6 wherein the source of plating material comprises a plate of the material sealed to the other end of the cylinder.

8. A memory element as in claim 1 wherein the source of plating material comprises an electrode immersed in the electrolyte.

9. A logic circuit comprising a plurality of memory elements, each of said memory elements including a substrate, a material for deposit on said substrate and means for depositing the material on said substrate in response to an electrical signal, input means for each of said memory elements for applying said electrical signal, means for deriving an electrical output from each of said memory elements representative of the material deposited thereon, summing means connected to receive the outputs and sum the same, and means for reversibly controlling the deposits on said substrates whereby to provide a desired sum output for given input signals.

10. A logic circuit as in claim 9 wherein the memory elements are each conected in a bridge circuit, an alternating current voltage of given phase and magnitude is applied to opposite terminals of the bridge, and the output signal is derived across the other terminals.

11. A logic circuit as in claim 9 including means for comparing the output with a desired output and controlling the deposit of material on the substrates to give the desired output.

12. A logic circuit as in claim 9 in which the deposits on all of the substrates are simultaneously adjusted to give the desired output.

13. A logic circuit comprising a plurality of memory elements, each of said memory elements including an electrolyte, a substrate having spaced terminals disposed in said electrolyte, a plating material in said electrolyte, means for reversibly plating material onto the substrate whereby the resistance between the spaced terminals is controlled, means for applying an input signal to one terminal of each of said memory elements, means for deriving an output signal representative of the resistance between the terminals, summing means for summing the output of each of said memory elements, and means for simultaneously controlling the plating on the substrates to thereby give a desired output signal.

14. A memory element comprising an electrolyte, a substrate electrode disposed in said electrolyte, spaced terminals connected to said substrate, material capable of electroplating onto the substrate disposed in the electrolyte, means responsive to data signals for reversibly transferring said material between the substrate and electrolyte, and means connected to said spaced terminals for sensing the resistance between the same while the substrate is disposed in the electrolyte, said resistance being representative of the data signals.

15. A memory element comprising an electrolyte, a substrate electrode disposed in said electrolyte, spaced terminals connected to said substrate, material capable of electroplating carried by the substrate, means responsive to data signals for transferring said material between different portions of said substrate, and means for sensing the resistance between said spaced terminals.

16. A memory element comprising an electrolyte, a substrate having first and second spaced terminals disposed in said electrolyte, said substrate having a predetermined resistance between said terminals, a material for plating onto said substrate disposed in said electrolyte, means for selectively plating said material on and off of said substrate, and means for sensing the resistance between said first and second terminals while the substrate is disposed in the electrolyte.

17. A circuit comprising a memory element including an electrolyte, a substrate having spaced terminals disposed in said electrolyte, a plating material in said electrolyte, means responsive to an electrical input signal for reversibly plating material onto the substrate whereby the electrical resistance between the spaced terminals is controlled, means for applying an input signal to said plating means, means for applying a readout voltage to said substrate, and means connected in circuit with said substrate for deriving an electrical output signal representative of the resistance of said substrate.

18. A memory element comprising an electrolyte, a substrate electrode disposed in said electrolyte, material having magnetic properties and capable of electroplating onto said substrate disposed in said electrolyte, at least one coil disposed in cooperative relationship with said substrate electrode, means responsive to data for plating said material onto or off of said substrate, means for supplying a magnetic field to said coil, said substrate being disposed whereby the material deposited thereon serves to vary the magnetic field coupled to said coil, and means connected to said coil for measuring the magnetic field coupled to said coil to thereby give an indication of the quantity of material on said substrate.

19. A memory element comprising an electrolyte, a substrate electrode disposed in said electrolyte, material capable of electroplating on said substrate disposed in said electrolyte, capacitive means formed in part by said substrate, changes in quantity of material on said substrate serving to change the capacity of said capacitive means, means for selectively depositing or removing material from said substrate, and means connecting to said capactive means for measuring the capacitance of said capacitive means to thereby give an indication of the quantity of material on said substrate.

References Cited by the Examiner

UNITED STATES PATENTS

| | | | |
|---|---|---|---|
| 2,428,812 | 10/1947 | Rajchman | 235—164 |
| 2,584,897 | 2/1952 | Marco | 235—179 X |
| 2,791,473 | 5/1957 | Mattox | 340—173 X |
| 2,910,647 | 10/1959 | Kreitsek | 324—68 |
| 2,917,814 | 12/1959 | Ruchelshaus | 324—68 |
| 2,922,934 | 1/1960 | Hall | 317—235 |
| 3,017,612 | 1/1962 | Singer | 340—173 |
| 3,069,622 | 12/1962 | Warsher | 324—94 X |
| 3,158,798 | 11/1964 | Sauder | 340—173 X |

IRVING L. SRAGOW, *Primary Examiner.*

BERNARD KONICK, *Examiner.*